United States Patent
Vincent (10) Patent No.: US 6,754,771 B2
(45) Date of Patent: *Jun. 22, 2004

(54) SYSTEM FOR SELECTIVELY TRANSFERRING APPLICATION DATA BETWEEN STORAGE DEVICES IN A COMPUTER SYSTEM UTILIZING DYNAMIC MEMORY ALLOCATION

(75) Inventor: Britto Vincent, Belmont, CA (US)

(73) Assignee: Synopsys, Inc., Mountain View, CA (US)

( * ) Notice: Subject to any disclaimer, the term of this patent is extended or adjusted under 35 U.S.C. 154(b) by 66 days.

This patent is subject to a terminal disclaimer.

(21) Appl. No.: 09/923,854

(22) Filed: Aug. 7, 2001

(65) Prior Publication Data

US 2002/0073291 A1 Jun. 13, 2002

Related U.S. Application Data

(63) Continuation-in-part of application No. 09/045,055, filed on Mar. 19, 1998, now Pat. No. 6,321,295.

(51) Int. Cl.[7] .......................... G06F 12/08; G06F 13/00
(52) U.S. Cl. ...................... 711/117; 711/165; 711/170; 703/22
(58) Field of Search ............................ 711/117, 161, 711/165, 170; 703/14, 15, 21, 22; 716/18

(56) References Cited

U.S. PATENT DOCUMENTS

| | | | |
|---|---|---|---|
| 4,926,322 A | * 5/1990 | Stimac et al. ................. 703/23 |
| 5,437,037 A | * 7/1995 | Furuichi ......................... 717/7 |
| 5,493,507 A | * 2/1996 | Shinde et al. .................. 716/18 |
| 5,526,277 A | * 6/1996 | Dangelo et al. ................. 716/3 |
| 5,530,843 A | * 6/1996 | Koyama ......................... 716/3 |
| 5,541,850 A | * 7/1996 | Vander Zanden et al. .... 716/18 |
| 5,572,436 A | * 11/1996 | Dangelo et al. .............. 716/18 |
| 5,581,742 A | * 12/1996 | Lin et al. ........................ 716/4 |
| 5,598,344 A | * 1/1997 | Dangelo et al. .............. 716/18 |
| 5,603,015 A | * 2/1997 | Kurosawa et al. ............ 703/15 |
| 5,604,889 A | * 2/1997 | Pickens et al. ............... 703/15 |
| 5,604,895 A | * 2/1997 | Raimi ........................... 703/13 |
| 5,794,005 A | * 8/1998 | Steinman ...................... 703/17 |
| 5,999,984 A | * 12/1999 | Fulcomer ..................... 709/247 |
| 6,321,295 B1 | * 11/2001 | Vincent ...................... 711/117 |

* cited by examiner

*Primary Examiner*—Glenn Gossage
(74) *Attorney, Agent, or Firm*—Bever, Hoffman & Harms, LLP; Jeanette S. Harms (57) ABSTRACT

A system can use a dynamic memory allocation technique to selectively transfer data between storage devices in the system. This dynamic memory allocation technique can simulate hard memory in software, which improves the efficiency of data transfers between the storage devices and dramatically increases system performance. The system may include a mass memory that stores application data and non-application data, a dump memory for receiving application data and non-application data from the mass memory, and a memory array for receiving only application data from the dump memory. The system may further include computer-readable instructions for performing the data transfers between the mass memory, the dump memory, and the memory array.

20 Claims, 6 Drawing Sheets

SYSTEM FOR SELECTIVELY TRANSFERRING APPLICATION DATA BETWEEN STORAGE DEVICES IN A COMPUTER SYSTEM UTILIZING DYNAMIC MEMORY ALLOCATION

CROSS REFERENCE TO RELATED APPLICATIONS

This application is a continuation-in-part of U.S. patent application Ser. No. 09/045,055, filed Mar. 19, 1998, now U.S. Pat. No. 6,321,295.

FIELD OF THE INVENTION

The present invention is directed to the selective transfer of data between storage mediums.

BACKGROUND OF THE INVENTION

The electronics field is becoming more competitive. New entrants to the market are generating tremendous pressure to increase efficiency of logic design, to reduce design cost, and, to reduce time to market. Extensive performance of simulation can detect design errors before a design is manufactured, and thus reduce the number of design iterations. The use of an efficient hardware description language (HDL) such as VERILOG® and a host simulation system have become invaluable for minimizing design errors, and have made it possible to fabricate functional chips in the first silicon processed.

Computers used as a host for a logic simulation program in one example employ a hierarchical information retrieval method for transferring information or data between data storage devices. One of the data storage devices is typically a mass storage device, such as a hard disk. Another of the data storage devices usually comprises a relatively faster and more accessible storage device such as random-access memory (RAM). Finally, an intermediate data storage device, such as a cache, is used to provide rapid, but usually very small, data transfers between the hard disk and random-access memory. The random-access memory is normally smaller than a hard disk and is usually a faster and more accessible storage device The relative size between the cache and the random-access memory varies. On a personal computer, the cache is usually smaller than the random access memory. On workstations and microcomputers, the cache is usually larger than the random access memory. Such a pattern commonly exists notwithstanding a use of multiple levels of hierarchy.

Common retrieval methods employ paging, swapping, or caching to improve the utilization data storage devices by reversibly transferring large blocks of information between the storage devices. While these retrieval methods normally improve the efficiency of a logic simulation program, that improved efficiency is merely a side effect rather than an intended purpose.

In prior logic simulation programs, the host simulation system uses a static memory allocation algorithm in the hardware description language which requires the employment of a random-access memory (hereinafter referred to as a "memory array") of a size at least equal to the entire simulated memory size. Thus, the permitted size of information or data transfers is determined largely by the physical size of the memory array. If, for example, a 128 megabit hard memory device is called for by the logic simulation program and the memory array has enough capacity, the entire contents of the hard memory device is transferred into the memory array. This can create substantial inefficiencies, especially with hard memory devices that are large.

Prior logic simulation programs are limited to either using expensive, large memory 15 arrays or performing the time-consuming operation of transferring the contents of relatively small increments of memory to the memory array, regardless of the usefulness of a particular memory increment. A need exists for a logic simulation program that does not use a full memory transfer like that utilized by the static memory allocation algorithm. Accordingly, the present invention provides a dynamic memory allocation algorithm for the hardware description language, that adjusts the amount of data transferred to the memory array, and, for example, can transfer less than the entire contents of a hard memory device in a logic simulation program. Fewer data transfers are made to the memory array. Thus, the total size of the data transferred to the memory array, in a logic simulation program employing the present invention, is much smaller than the entire size of the memory that is simulated.

SUMMARY OF THE INVENTION

A hardware description language (HDL) such as VERILOg® does not have a dynamic memory allocation scheme in its native format. This forces designers to use a static memory allocation scheme when they use the standard IDL. Through. employment of the present invention, a logic simulation program, in which circuit information is described with an HDL such as VERIILOG, can use the circuit information both as input to a circuit simulation and as addressing information. The addressing information is then used to provide hierarchical information retrieval within the simulation data, thereby reducing the amount of data that is to be transferred between a storage device, such as a cache (hereinafter referred to as a "dump memory"), and a storage device, such as a memory array. Since the amount of data that needs to be transferred is reduced, the time required for transferring this data is consequently reduced, thereby increasing the efficiency of the logic simulation program utilizing the storage devices. The use of the addressing information also reduces the size required of a dump memory and a memory array for a certain performance.

The present invention also uses the circuit information for partitioning structures, such as in hard memory devices, into more convenient sizes for simulation, for instance, by a logic simulation program. The addressing information may also be used for generating tables of information about the structure of the objects, such as in hard memory, which are to be partitioned or paged into a memory array. This further enhances the speed of and reduces the size of information transfers.

The present invention in one example provides a system for selectively transferring data between storage devices in a computer system. The system includes a first data storage device, a second data storage device, a third data storage device, and a computer readable signal bearing medium. Means in the medium transfers application data and non-application data from the first data storage device to the second data storage device. Means in the medium examines data in the second data storage device to identify the application data. Means in the medium derives a secondary address for the application data. Means in the medium transfers only application data indicated by the secondary address from the second data storage device to the third data storage device. Means in the medium parses the application data indicated by the secondary address. Means in the medium transfers parsed application data from the third data storage device to the second data storage device. Means in the medium transfers the parsed application data and the non-application data from the second data storage device to the first data storage device. Means in the medium dumps unexamined data to the second data storage device.

The present invention in another example comprises a system for selectively transferring data between storage devices in a computer system. The system includes a first data storage device that stores the application data and non-application data. A second data storage device receives a dump of at least a part of the application data and the non-application data from the first data storage device. A memory controller examines data in the second data storage device to identify the application data and derive a secondary address for the application data. A third data storage device receives only application data indicated by the secondary address from the second data storage device. The memory controller parses the application data indicated by the secondary address; transfers parsed application data from the third data storage device to the second data storage device, transfers the parsed application data and the non-application data from the second data storage device to the first data storage device, and dumps unexamined data from the first data storage device to the second data storage device.

It is an object of the present invention to provide an improved logic simulation program which requires less time, and uses less expensive hardware, to perform a logic simulation.

Another object of the present invention is to perform a logic simulation with an algorithm that dynamically changes the size of data transferred to the memory array, so that the total size of the data transferred is much smaller than the entire size of the memory that is simulated.

A further object of the present invention is to perform a logic simulation with an algorithm that transfers less data than would occupy the entire simulated memory to a memory array.

Other and further advantages, embodiments, variations and the like will be apparent to those of skill in the art from the present specification taken with the accompanying drawings and appended claims.

BRIEF DESCRIPTION OF THE DRAWINGS

The accompanying drawings, which are incorporated in and constitute a part of the specification, illustrate presently preferred embodiments of the present invention. Together with the general description given above and the detailed description of the preferred embodiments given below, the drawings serve to explain the principles of the present invention in which.

DETAILED DESCRIPTION

Generally, computers and network systems use data storage space or memory space allocated among at least three different types of storage devices wherein the type of memory in each device may be different in function and/or size. First, mass memory is generally preferable for bulk storage. Data is typically stored in mass memory in segments, called data blocks. Data blocks are well-suited for mass storage but are not efficiently communicated to a computer. Data blocks also are not efficiently organized or sorted. For example, data relating to one application may be interspersed with other data. This is known as fragmenting. Fragmenting causes data related to one application to be transferred out of mass memory, with data that is unrelated to the application.

Since data blocks are not efficient for direct communication, they are typically mass transferred, using a second type of memory called dump memory. Dump memory is organized to optimally receive data blocks from bulk memory. However, dump memory is also capable of transferring data in sizes that are compatible with a memory array. In the prior systems, data in dump memory that is related to a particular application is transferred to a memory array without examination or discrimination. In contrast, the present invention examines data in the dump memory to flag only the data that the application being processed needs. In this way, data that the application being processed does not need can be avoided by the application. Thus, the present invention improves the speed of a circuit simulation operating in a host system by approximately fifteen to twenty times when compared to the prior art.

The dump memory can be considered as having a formatting capability, since it can communicate efficiently with mass memory in storage device having data blocks, and can also communicate with the memory array selectively in memory words, which are smaller than data blocks. This formatting by the dump memory allows the memory array to organize data for efficient utilization by applications, such as in a logic simulation program.

As was stated above, often the dump memory communicates with one or more mass memories in which data often is fragmented between applications. The dump memory also communicates with the memory array by flagging and making available data that is needed by the memory array. This allows the data to be used by an application, such as a logic simulation program.

The memory array collects or loads the data in convenient packets, often called words, and organizes the data for efficient utilization by an application. The memory array organizes the data by using dump memory flags and global information from the operating system of the computer or from the user, etc. The memory array may also receive guidance from the application, e.g., in the form of start/stop addresses, etc., and in some cases in the form of packet size requirements. These operations are in the form of commands for manipulating an object, such as a simulated memory, etc., as a unit. For example, if a hard memory or a portion thereof is required by a task, as defined by the memory controlling circuitry of the computer operating system, etc., that is what is loaded. This might be the entire hard memory, or as much of it as can be conveniently loaded in the space available.

If an application calls for data that is too large for the available space in the memory array, the memory controller function, however implemented, transfers to the memory array only as much data as can be stored. This is not a function of the task being performed by the application, only of the available space. When another part of the data is required, it is dumped into the dump memory. Of course, if the previous data in the dump memory was changed, it will first be transferred back to bulk memory. This process is often called swapping or paging, and the overall process was historically referred to as virtual memory management. Note that the dumping process may also be controlled by an application, though even then the dumping is done on the data as an object rather than on smaller pieces of the data; that is, on the data hierarchy. The function of transferring and manipulating memory objects is usually performed by the memory controller, which is often called direct memory access logic.

Figure 1:
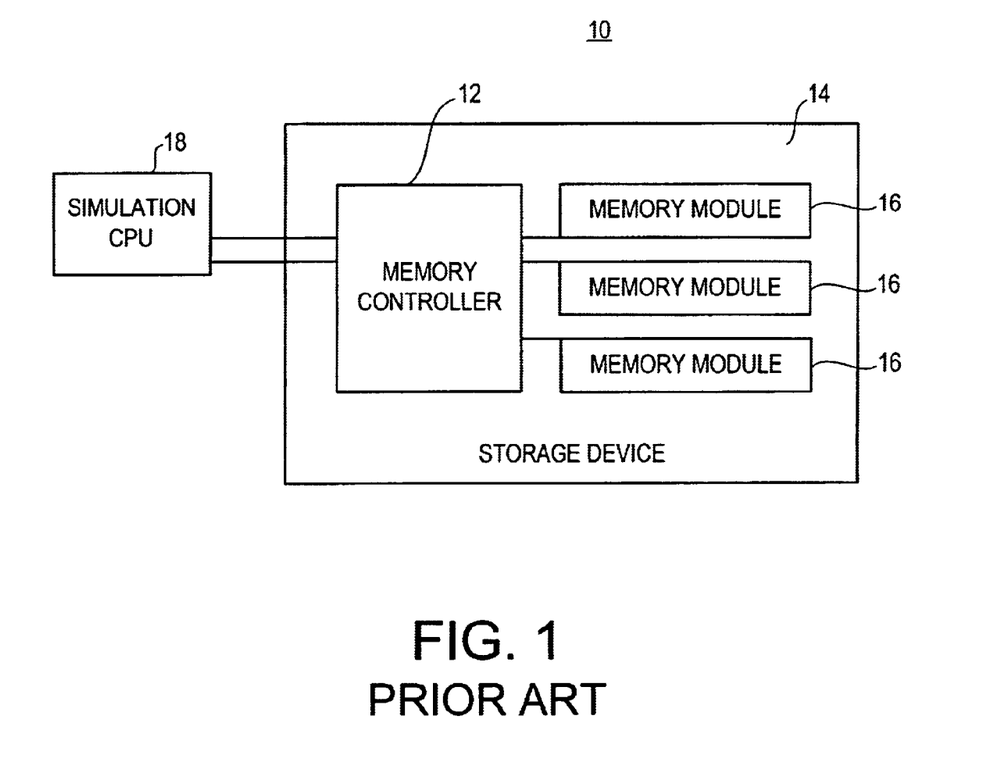
FIG. 1 is diagram showing the conventional arrangement of a system employable for running a logic simulation program.

FIG. 1 illustrates the general arrangement of a system 10 employable for running a logic simulation program. The system 10 comprises storage device 14, and simulation microprocessor 18 (or central processing unit (CPU)). Storage device 14 comprises a plurality of memory modules 16, and memory controller 12. Examples of memory modules include, but are not limited to, Dynamic Random Access Memory (DRAM), static random access memory (SRAM), Synchronous Dynamic Random Access Memory (SDRAM), RAMIBUS®DRAM and extended data out (EDO) DRAM memory devices. Simulation microprocessor 18 is connected to memory controller 12 for controlling the transfer of data to memory modules 16.

Figure 2:
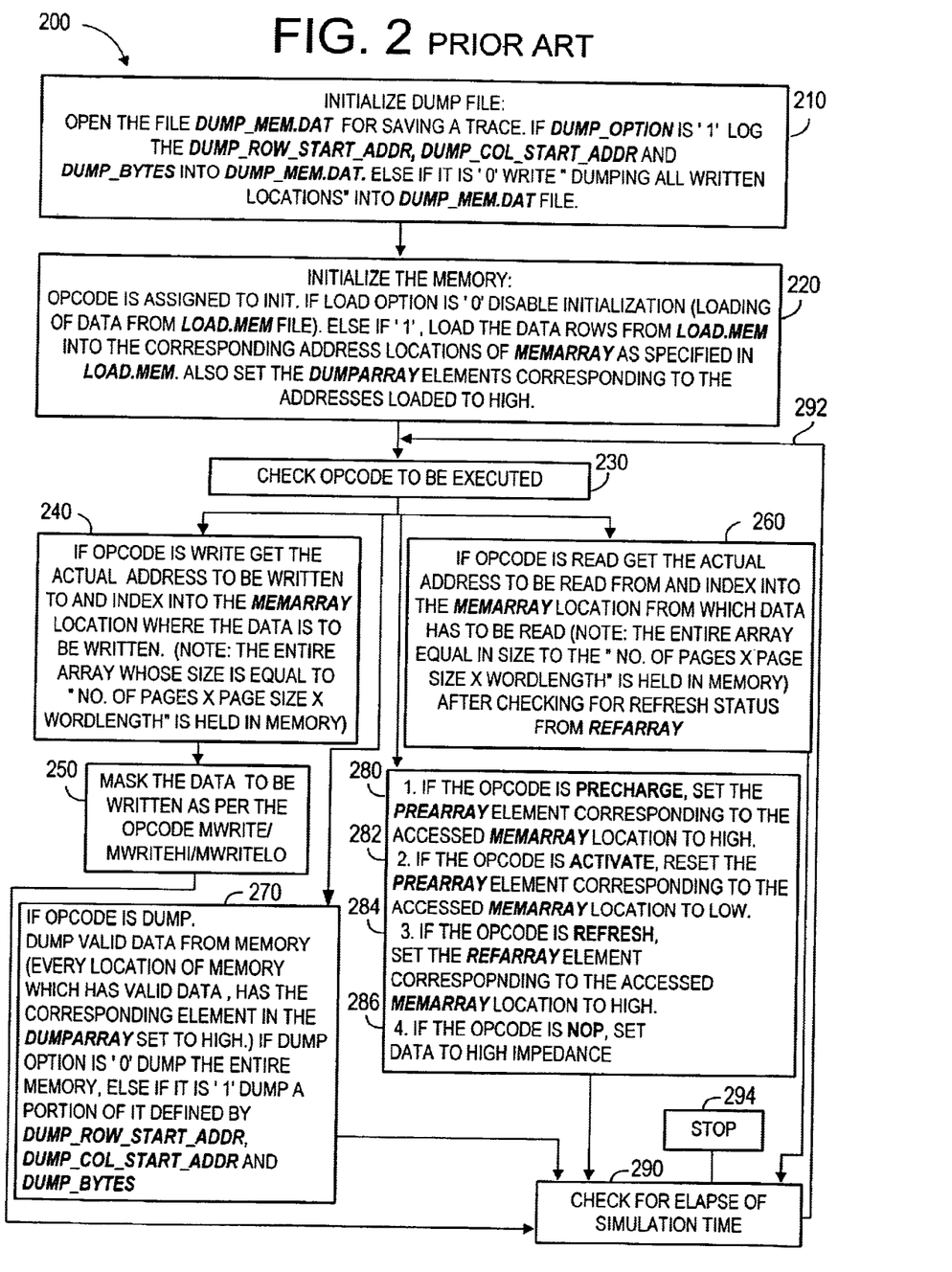
FIG. 2 is a flowchart for a typical logic simulation program utilizing a static memory allocation algorithm.

A flowchart 200, illustrating the operation of a typical simulation program using a static memory allocation algorithm and VERILOG® HDL for simulating a hardware device, such as a memory controller, is shown in FIG. 2. The prior art flowchart 200 begins with step 210 of initializing a dump file for controlling the operations on the dump memory. In step 210, a file dump-mem.dat is opened. Dump-mem.dat contains a trace of the dumps (dump-mem.dat is also sometimes called a "history" file). Initializing the dump file is the same as initializing the dump memory, because the dump file is used to control the dump memory. In the dump file initializing step 210, a variable called DUMP-OPTION is checked. If DUMP_OPTION is '1', then the DUMP_ROW_START_ADDR, which is the row address from which dumping is started, the DUMP_COL_START_ADDR, which is the column address in the starting row address from which dumping is started, and the DUMP_BYTES, which is the number of bytes to be dumped from the starting column address in the starting row address, are logged into the dump-mem.dat file. Otherwise, if the DUMP-OPTION is '0', then "dumping all written locations" is written into the dump-mem.dat file.

Then the dump memory is initialized in step 220 by assigning the operation code OPCODE to the initiate routine (INIT). In step 220 a variable called LOAD_OPTION is checked. If LOAD_OPTION is '0', dump memory initialization is disabled, which stops the loading of data from the load.mem file. The load.mem file includes row addresses and corresponding data to be written into for initialization. Memarray is a register array equal in size to the number of pages with each register of memarray equal in size to the number of columns in load.mem multiplied by the word length used in load.mem. If LOAD_OPTION is '1', the memory initialization is enabled to load the data rows of load.mem into corresponding address locations of memarray as specified in the load.mem file. The elements in dumparray corresponding to the loaded addresses are set to high. Dumparray is an array of single bit registers. Dumparray is equal in size to the number of pages in a bank. For example, each entry in this file is a 20-bit hex value with a format having a 4-bit bank select value followed by a 16-bit row-address.

In step 230, the OPCODE is checked and the commands therein are executed and parsed. As a result, all data which is flagged is transferred from the dump memory to the memory array. All data is transferred regardless of whether it is required by the application. The flags or references from the dump memory are not parsed to only transfer the data required by the application into the memory array.

Upon parsing, if a command in the OPCODE is WRITE, then in step 240 the address to where the data is to be written is retrieved and is written and indexed into the memarray location. In step 240, an entire array with a size equal to the number of pages multiplied by the page size and the word length is held in dump memory. Subsequently, the data to be written is masked in step 250 as per the OPCODE as a MWRITE/MWRITEHi/MWRITELo file.

If the OPCODE is READ then in step 260, refarray which is an array of single bit registers equal in size to the number of pages in the bank, is checked for a refresh status. Subsequently, an address from where the data is to be read is retrieved and is read from and indexed into the memarray location. In step 260, an entire array with a size equal to the number of pages multiplied by the page size and the word length is held in dump memory.

If the OPCODE is DUMP, then in step 270, valid data, which is every location in memory which has a corresponding element in dumparray set to high, is dumped from dump memory. The dump step 270 has the option of dumping the entire dump memory or part of the dump memory. If DUMP_OPTION is '0', for example, the entire dump memory is written into bulk memory at the address from which it was fetched. Otherwise, a portion of the memory defined by the DUMP_ROW_START_ADDR, the DUMP_COL_START_ADDR, or the DUMP_BYTES data is stored in the dump-mem.dat file.

A number of housekeeping instructions are also performed by parsing the OPCODE. For example, if the OPCODE is PRECHARGE, an element in prearray, corresponding to an accessed memarray location, is set to high in step 280. Prearray is an array of single bit registers equal in size to the number of pages in the bank. If the OPCODE is ACTIVATE, an element in prearray, corresponding to the accessed memarray location, is reset to low in step 282. If the OPCODE is REFRESH, the element in refarray corresponding to the accessed memarray location is set to high in step 284. If the OPCODE is NOP, then the data is set in step 286 to high impedance by a place holding instruction.

After the above specific examples are performed, the elapsed simulation time is checked 30 in step 290. Loop 292 is repeated until the parsing of the OPCODE is complete, then the simulation stops in step 294.

The prior art flowchart 200 in FIG. 2 demonstrates an important limitation of the prior art wherein data is provided to the simulation program based on the readily accessible space on the storage device and only an amount of data that fits in the storage device is loaded into the simulation. The result is a lengthy time period for transferring chunks of memory into the storage device. Timing could be increased only by dramatically increasing the size of the storage device.

Figure 3:
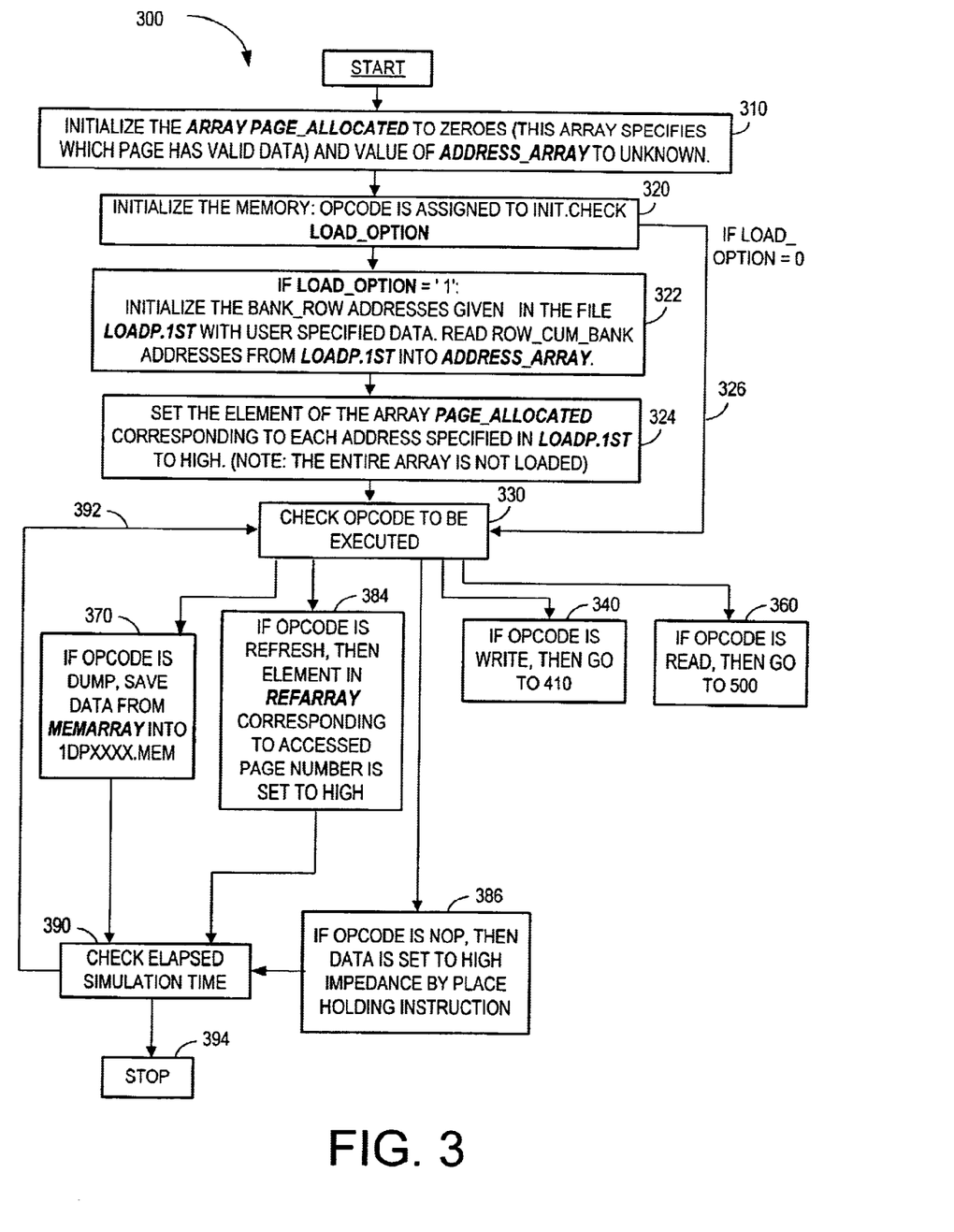
FIG. 3 is a flowchart illustrating the transferring of selected contents of memory to a memory array utilizing dynamic memory allocation.

A flowchart 300 illustrating one embodiment of the present invention for transferring selected contents of memory to a memory array utilizing a dynamic memory allocation algorithm is shown in FIG. 3. The dynamic memory allocation flowchart 300 begins with the step 310 in which an area in dump memory is prepared for new data by initializing the dump memory. Specifically, an array page_allocated, which is an array of single bit registers equal in size to a number of pages in the bank, is initialized and set to zeroes. The page_allocated array specifies which page has valid data. An array address_array is also initialized and set to indicate unknown. The address_array is a register array of equal size to the number of pages to be initialized.

Then the dump memory is initialized in step 320 by assigning the operation code OPCODE to the initiate routine (INIT) and checking the LOAD_OPTION. If the LOAD_OPTION is '1', the bank_row addresses given in the loadp.1st file are initialized in step 322 with user specified data. The row_cum_bank addresses are also read from the loadp.1st file into the address_array. Then the elements corresponding to each address specified in loadp.1st is set in step 324 to high. At step 324, the entire array is not loaded. The loadp.1st file is only used if the LOAD_OPTION is '1'.

In the memory initializing step 320, if the LOAD_OPTION is '0', the memory initialization is disabled which stops the loading of the user specified data. The bypass 326 proceeds directly to continue parsing the OPCODE.

In step 330 the OPCODE is checked and the commands therein are executed or parsed. As a result, the flags or references from the dump memory are parsed to determine whether the data fragments that relate to the application or device will be loaded into the memory array.

Upon parsing, if the QPCODE is DUMP, then in step 370 the data is saved from memarray into the file ldpxxxx.mem. If the OPCODE is REFRESH, the element in refarray corresponding to the accessed pagenumber is set in step 384 to high. If the OPCODE is NOP, then the data is set in step 386 to high impedance by a place holding instruction. After these specific examples are performed, the elapsed simulation time is checked in step 390. Loop 392 is repeated until the parsing of the OPCODE is complete. Then the simulation stops in step 394.

Figure 4:
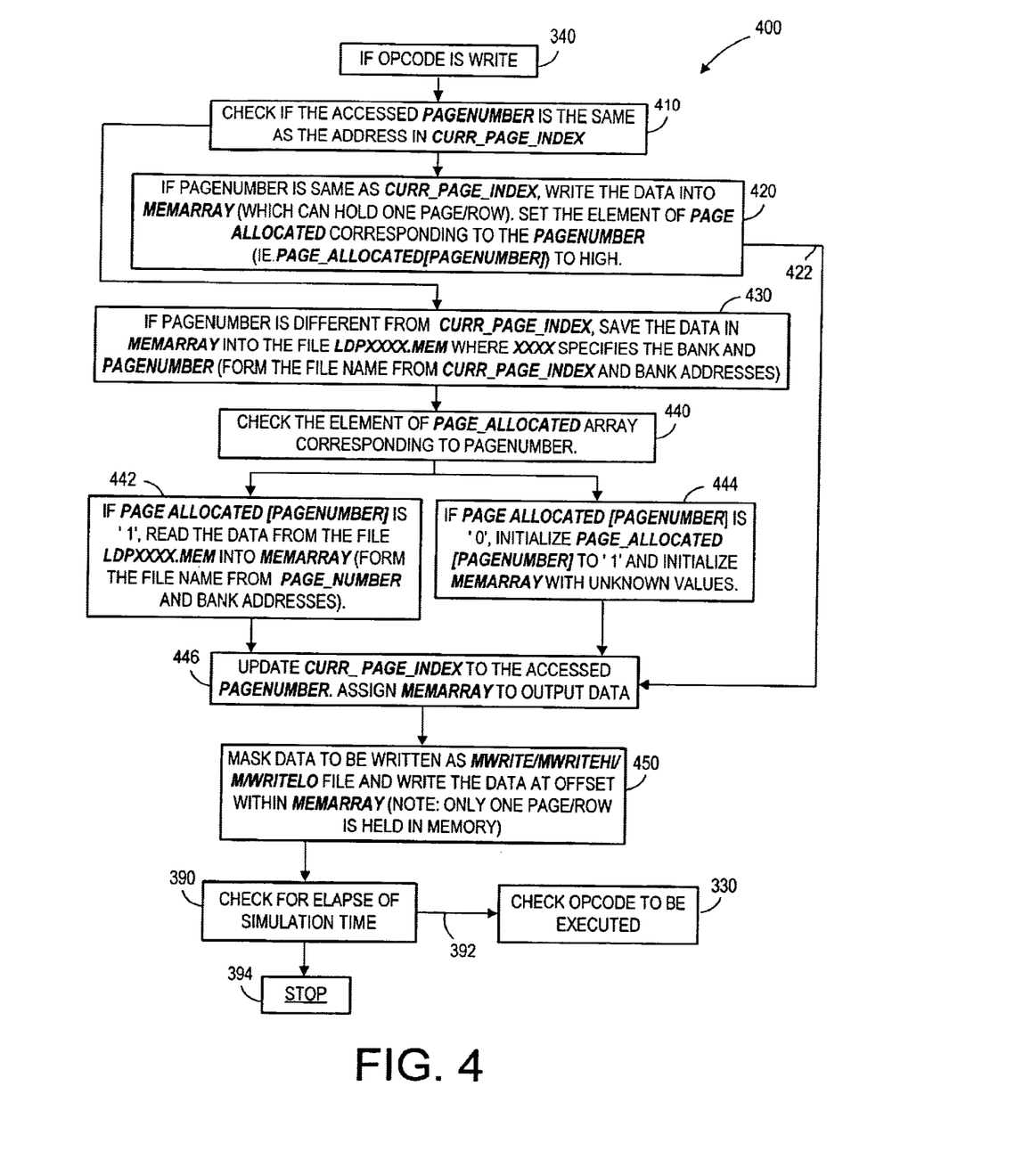
FIG. 4 is a flow chart illustrating a WRITE utilizing dynamic memory allocation.

A flowchart 400 for the WRITE routine of step 340 is illustrated in FIG. 4. If the OPCODE is WRITE in step 340, then in step 410 the pagenumber which is the currently accessed row/page in the bank is checked against the curr_page_index, which is the pagenumber that was last accessed.

If the pagenumber and curr_page_index are the same, then the data is written in step 420 into memarray which can hold one page/row. The element page_allocated, corresponding to the pagenumber, i.e., page_allocated, is also set to high. Subsequently, the OPCODE proceeds directly via bypass 422 to the step 450 of masking the data to be written as a MWRITE/MWRITEHi/MWRITELo file and the data is written at the offset within the memarray. At this step, only one page/row is held in the memory array. Then the lapse of the simulation time is checked in step 390 and either returns via path 392 to the step 330 of checking the OPCODE for additional instructions to be executed or stops in step 394.

If the pagenumber and curr_page_index are different, then the data in memarray is saved in step 430 into the file ldpxxxx.mem which consists of the user defined data for any one row. In the file ldpxxxx.mem, the bank and pagenumber is specified by xxxx. The file name is formed from the curr_page_index and bank addresses within the application or device and allows the transfer of reduced information into the memarray.

Then the element of the page_allocated array corresponding to the pagenumber, i.e., the page_allocated is checked in step 440. If page_allocated is '1', the data from the file ldpxxxx.mem is read in step 442 into memarray. The file name is formed from the page_number and bank addresses. If page-allocated is '0', then page_allocated is initialized in step 444 to '1' and memarray is also initialized with unknown values.

After the step 440 of checking the element of page_allocated array corresponding to the pagenumber and either step 442 or 444, the curr_page_index is updated in step 446 to the accessed pagenumber. Memarray is also assigned to output the data.

Subsequently, the OPCODE performs the previously described step 450 of masking the data to be written as a MWRITE/MWRITEHi/MWRITELo file and the data is written at the offset within memarray. At step 450, only one page/row is held in memory. Then the lapse of the simulation time is checked in step 390 and either returns via path 392 to the step 330 of checking the OPCODE for additional instructions to be executed or stops in step 394.

Figure 5:
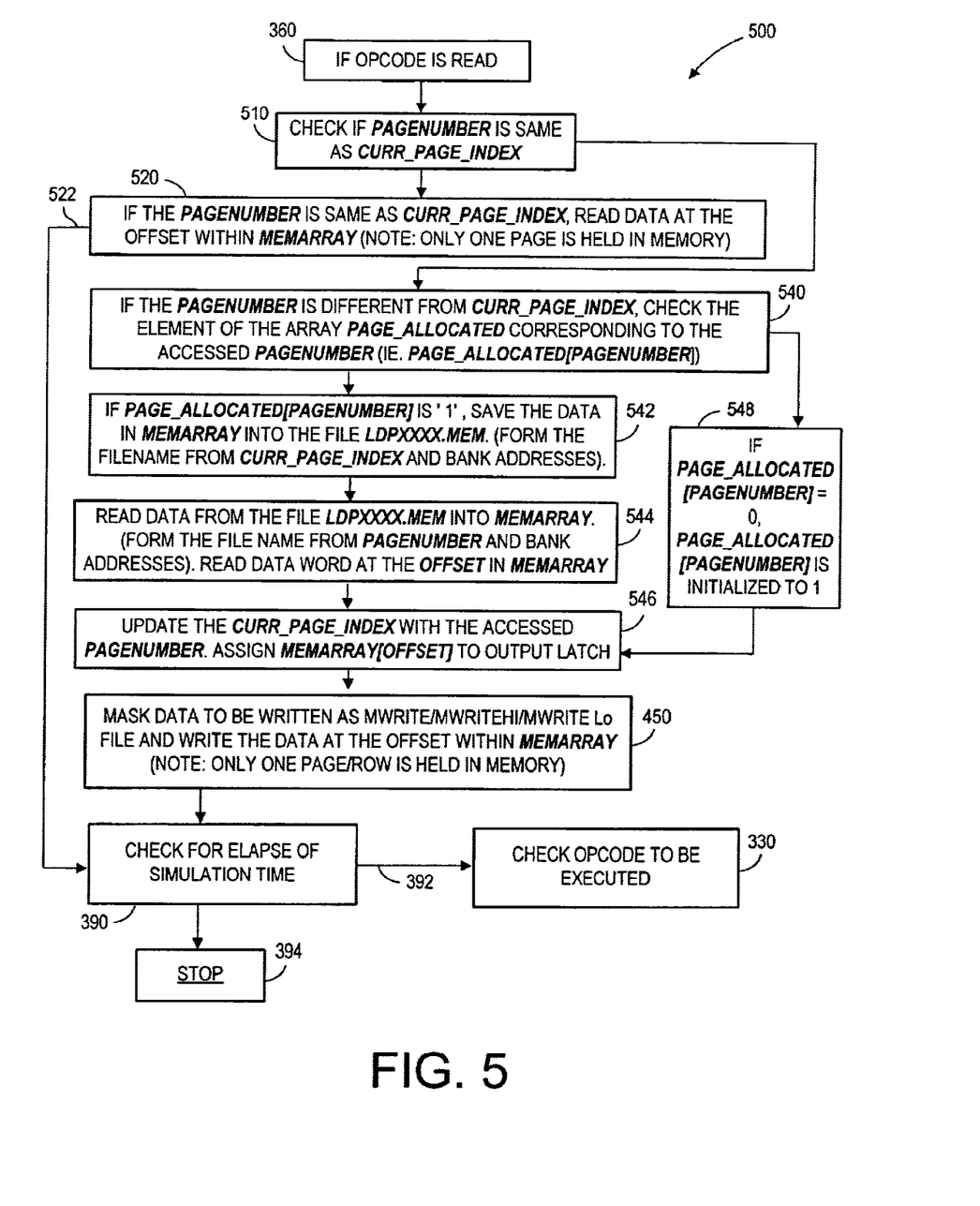
FIG. 5 is a flow chart illustrating a READ routine utilizing dynamic memory allocation.

A flowchart 500 for the READ routine in step 360 is illustrated in FIG. 5. If the OPCODE is READ in step 360, then the pagenumber which is the currently accessed row/page in the bank is checked in step 510 against the curr_page_index which is the pagenumber that was last accessed.

If the pagenumber and curr_page_index are the same, then the data at the offset within the memarray is read in step 520. The offset is the currently accessed column address. The memory holds only one page/row. Subsequently, the OPCODE proceeds directly via bypass 522 to the step 390 of checking the lapse of the simulation time and either returns via path 392 to the step 330 of checking the OPCODE for additional instructions to be executed or stops in step 394.

If the pagenumber and curr_page_index are different, then the element of the page_allocated array corresponding to the pagenumber i.e., the page_allocated is checked in step 540. If page_allocated is '1', the data from memarray is saved in step 542 into the file ldpxxxx.mem. The file name is formed from the curr_page_index and bank addresses. The data from the file ldpxxxx.mem is read in step 544 into memarray and the data word at the offset into memarray. The file name is formed from the pagenumber and bank addresses.

If page_allocated is '0', page_allocated is initialized in step 548 to '1' and memarray is also initialized by indicating unknown values.

Subsequently, the OPCODE performs the previously described step 450 of masking the data to be written as a MWRITE/MWRITEHi/MWRITELo file and the data is written at the offset within memarray. In step 450, only one page/row is held in the memory array. Then the lapse of the simulation time is checked in step 390 and either returns in step 392 to the step 330 of checking the OPCODE for additional instructions to be executed or stops in step 394.

The flowcharts in FIGS. 3–5 demonstrate how the present invention uses dynamic memory or additional parsing with the data inside the dump memory, so that steps to be performed by the device can be used to reduce the amount of data that must be transferred from the dump memory to the memory array. By contrast, the static memory utilized by the prior art flowchart 200 (FIG. 2) flagged all data as part of the application and transferred it from the dump memory to the memory array, whether the device required it or not.

Since transfers between dump memory and the memory array are generally slow, reducing the data to be transferred can significantly reduce the time required to process an application. Also, since very large temporary files are required by some applications, such as a logic simulation program, and since these temporary files often reside in the memory array, reducing the size of transfers to and from the memory array by the teachings of the invention can be very beneficial.

The above description of one aspect of the present invention that uses dynamic memory allocation to improve a logic simulation program is only one example. The present invention can also be used in any computer or network system utilizing three or more memory storage devices to transfer data to and from user applications.

Figure 6:
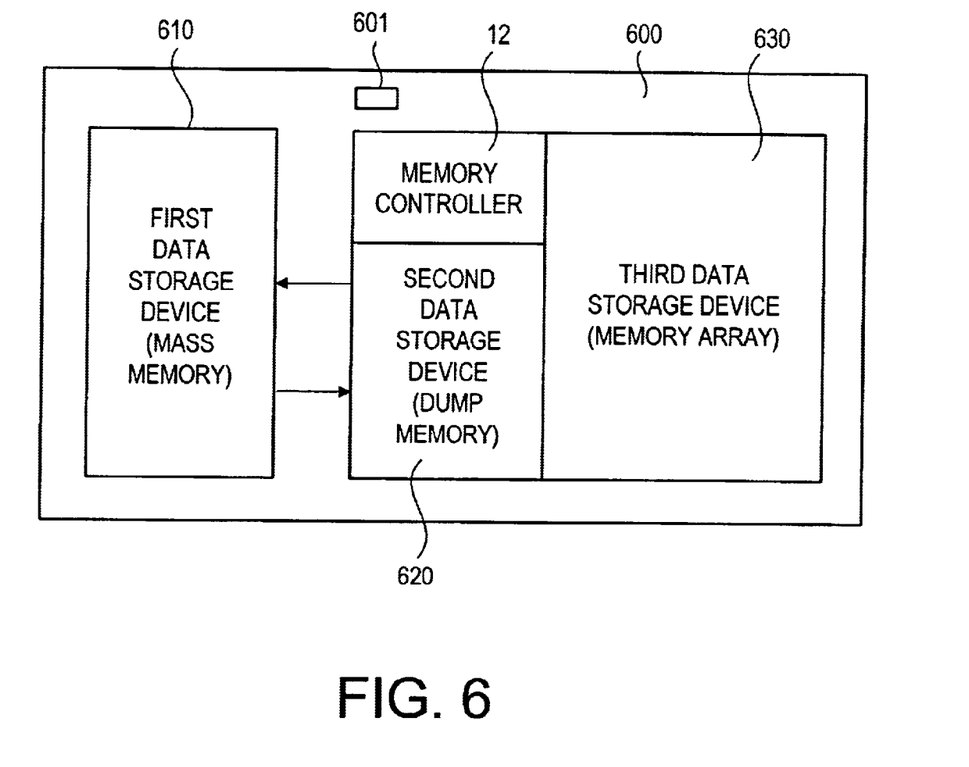
FIG. 6 is a diagram illustrating a computer or network system having at least three varied data storage devices utilizing the dynamic memory allocation of the present invention.

FIG. 6 illustrates a computer or network system 600 having three data storage devices that could utilize the dynamic memory allocation of the present invention. System 600, in one example, includes a plurality of components such as computer software and/or hardware components. A number of such components can be combined or divided in one example of system 600. System 600 in one example employs at least one computer-readable signal-bearing medium 601. One example of a computer-readable signal-bearing medium 601 for system 600 comprises a recordable data storage medium such as a magnetic or optical data storage medium In another example, a computer-readable signal-bearing medium for system 600 comprises a modulated carrier signal transmitted over a network comprising or coupled with system 600, for instance, a telephone network, a local area network ("LAN"), the Internet, and/or a wireless network. An exemplary component of system 600 employs and/or comprises a series of computer instructions written in or implemented with any of a number of programming languages, as will be appreciated by those skilled in the art.

In one example the computer system or network system 600 includes a first data storage device 610 which is typically a mass memory, a second data storage device 620 which is a dump memory, and a third data storage device 630 which is usually a memory array. The dump memory forms an interface or translator between the mass memory and the memory array. Like the mass memory, the dump memory can accept large blocks of data in a mass transfer mode from the mass memory. The dump memory can also efficiently transfer data to and from the memory array in smaller units, such as words. Word is a known term in the art, and refers to data in a form convenient for use in computations and general data handling operations, e.g. in a computer.

For general reference, the second storage device 620, also called swap space or virtual memory, is normally several times larger than the third storage device 630, but is itself generally much smaller than the first storage device 610, often many hundreds or thousands of times smaller.

The first storage device 610, such as a tape array, disk array, compact disc-read only memory (CD-ROM), etc., can be both read and written to for the purposes of the present invention although memory which cannot be written to is also suitable. The first storage device 610 is interfaced to the second storage device 620, which is generally selected from devices normally used as dump memory.

The second storage device is interfaced to the third storage device, which is generally the smallest and fastest memory space available in the computer system 600. As a result, the second storage device 620 is generally much smaller and faster than the mass memory 610, but is much larger and slower than the third storage device 630.

The second storage device 620 is given an address in memory from which the data is to be transferred. The number of bytes to be transferred or the length of the data unit is generally known or user specified. The second storage device 620 also examines or parses the data units to determine which pieces of data to be transferred are applicable to an application, since data is often broken up across blocks into smaller data units or fragments. While the information about how the data is fragmented is often a part of the block of data being transferred, the second storage device 620 allocates an area where flags or indicators of the data validity with respect to a system are kept. A flag buffer can be used to hold the flags.

The addressing information is used to provide hierarchical information retrieval within the simulation data, thereby reducing the data that is to be transferred from and to the first storage device and to and from the second storage device. The amount of data that needs to be transferred is thereby reduced and the time required for transferring this data is consequently reduced, increasing the efficiency of a logic simulation program. The addressing information also reduces the size required in the second storage.

In one example of system 600, various means in computer-readable signal bearing medium 601 operated either solely or in conjunction with the various components of system 600 to effect the present invention. For instance, means in the medium transfers application data and non-application data from the first data storage device 610 to the second data storage device 620. Means in the medium examines data in the second data storage device 620 to identify the application data. Means in the medium derives a secondary address for the application data. Means in the medium transfers only application data indicated by the secondary address from the second data storage device 620 to the third data storage device 630. Means in the medium parses the application data indicated by the secondary address. Means in the medium transfers parsed application data from the third data storage device 630 to the second data storage device 620. Means in the medium transfers the parsed application data and the non-application data from the second data storage device 620 to the first data storage device 610. Means in the medium dumps unexamined data to the second data storage device 620.

In another example first data storage device 610 stores the application data and non-application data. Second data storage device 620 receives a dump of at least a part of the application data and the non-application data from the first data storage device 610. Memory controller 12 examines data in the second data storage device 620 to identify the application data and derive a secondary address for the application data. Third data storage device 630 receives only application data indicated by the secondary address from the second data storage device 620. Memory controller 12 parses the application data indicated by the secondary address; transfers parsed application data from the third data storage device 630 to the second data storage device 620, transfers the parsed application data and the non-application data from the second data storage device 620 to the first data storage device 610, and dumps unexamined data from the first data storage device 610 to the second data storage device 620.

Although the above description contains specific examples, these should not be construed as limiting the scope of the invention, but as merely providing illustrations of some of the preferred embodiments of this invention. Many variations are possible and are to be considered within the scope of the present invention. Thus the scope of the invention should be determined not by the examples given herein, but rather by the appended claims and their legal equivalents.

What is claimed is:

1. A system employable for running a computer-readable program, the system comprising:
   a first data storage device;
   a second data storage device;
   a third data storage device;
   a computer-readable signal-bearing medium;
   means in the medium for transferring application data and non-application data from the first data storage device to the second data storage device;
   means in the medium for examining data in the second data storage device to identify the application data;
   means in the medium for deriving a secondary address for the application data;
   means in the medium for transferring only application data indicated by the secondary address from the second data storage device to the third data storage device;
   means in the medium for parsing the application data indicated by the secondary address;
   means in the medium for transferring parsed application data from the third data storage device to the second data storage device;
   means in the medium for transferring the parsed application data and the non-application data from the second data storage device to the first data storage device; and
   means in the medium for dumping unexamined data from the first data storage device to the second data storage device.

2. The system of claim 1, further comprising:
   means in the medium for initializing a page_allocated register in the second data storage device equal in size to a number of pages in the application data; and
   means in the medium for initializing an address_array register in the second data storage device equal in size to a number of pages in the application data to be initialized.

3. The system of claim 1, further comprising:
   means in the medium for initializing an address file with the application data;
   means in the medium for reading addresses from the address file to an address_array register; and
   means in the medium for setting a page_allocated register corresponding to each address in the address file to a known high value.

4. The system of claim 1, wherein the means in the medium for examining comprises:
   means in the medium for writing the application data into a memory array register, if a currently accessed pagenumber is the same as a last accessed pagenumber;
   means in the medium for setting an element of a page_allocated array corresponding to the currently accessed pagenumber to a known high value; and
   means in the medium for masking the application data and writing the application data at an offset within the memory array register.

5. The system of claim 1 wherein the means in the medium for examining comprises:
   means in the medium for writing the application data in a memory array register to a ldpxxxx.mem file, if a currently accessed pagenumber is different from a last accessed pagenumber;
   means in the medium for reading the application data from the ldpxxxx.mem file into the memory array register, if an element of a page_allocated array corresponding to the currently accessed pagenumber is a first predetermined value;
   means in the medium for initializing the element of the page_allocated array corresponding to the currently accessed pagenumber to the first predetermined value and initializing the memory array register to indicate a known value, if the element of the page_allocated array corresponding to the pagenumber is a second predetermined value;
   means in the medium for setting the last accessed pagenumber to the currently accessed pagenumber; and
   means in the medium for masking the application data and writing the application data at an offset within the memory array register.

6. The system of claim 1 wherein the means in the medium for examining comprises:
   means in the medium for reading the application data at an offset within a memory array register, if a currently accessed pagenumber is the same as a last accessed pagenumber.

7. The system of claim 1 wherein the means in the medium for examining comprises:
   means in the medium for writing the application data to a ldpxxxx.mem file, if an element of a page_allocated array corresponding to a currently accessed pagenumber is a first predetermined value and the currently accessed pagenumber is different from a last accessed pagenumber;
   means in the medium for reading the application data in a memarray register to the ldpxxxx.mem file;
   means in the medium for reading an application data word at an offset in the memarray register; and
   means in the medium for setting the last accessed pagenumber to the currently accessed pagenumber.

8. A system employable for running a computer-readable program, the system comprising:
   a first data storage device that stores application data and non-application data;
   a second data storage device that receives a dump of at least a part of the application data and the non-application data from the first data storage device;
   a memory controller that examines data in the second data storage device to identify the application data and derives a secondary address for the application data; and
   a third data storage device that receives only application data from the second data storage device that is indicated by the secondary address,
   wherein the memory controller parses the application data indicated by the secondary address, transfers parsed application data from the third data storage device to the second data storage device, transfers the parsed application data and the non-application data from the second data storage device to the first data storage device, and dumps unexamined data from the first data storage device to the second data storage device.

9. The system of claim 8 wherein:
   the first data storage device is a mass storage device selected from the group consisting of a hard disk, a compact disk read-only memory (CD-ROM), and a tape;
   the second data storage device is a random-access memory; and the third data storage device is selected from the group consisting of dynamic random-access memory (DRAM), static random-access memory (SRAM), synchronous dynamic random-access memory (SDRAM), and extended data out dynamic random-access memory (EDO DRAM).

10. The system of claim 8 wherein:

the application data represents a circuit to be simulated.

11. The system of claim 10 wherein:

the second data storage device contains addresses partly determined by the application data.

12. The system of claim 10 wherein:

the circuit is described in a hardware description language (HDL).

13. The system of claim 12 wherein:

the hardware description language is VERILOG®.

14. A computer-readable signal-bearing a plurality of computer readable instructions, the computer-readable signal-bearing medium comprising:

instructions for transferring application data and non-application data from a first data storage device to a second data storage device;

instructions for examining data in the second data storage device to identify the application data;

instructions for deriving a secondary address for the application data;

instructions for transferring only application data indicated by the secondary address from the second data storage device to a third data storage device;

instructions for parsing the application data indicated by the secondary address;

instructions for transferring parsed application data from the third data storage device to the second data storage device;

instructions for transferring the parsed application data and the non-application data from the second data storage device to the first data storage device; and instructions for dumping unexamined data from the first data storage device to the second data storage device.

15. The computer-readable signal-bearing medium of claim 14, further comprising:

instructions for initializing a page_allocated register in the second data storage device equal in size to a number of pages in the application data; and instructions for initializing an address_array register in the second data storage device equal in size to a number of pages in the application data to be initialized.

16. The computer-readable signal-bearing medium of claim 14, further comprising:

instructions for initializing an address file with the application data;

instructions for reading addresses from the address file to an address_array register; and instructions for setting a page_allocated register corresponding to each address in the address file to a known high value.

17. The computer-readable signal-bearing medium of claim 14, wherein the means in the medium for examining comprises:

instructions for writing the application data into a memory array register, if a currently accessed pagenumber is the same as a last accessed pagenumber;

instructions for setting an element of a page_allocated array corresponding to the currently accessed pagenumber to a known high value; and instructions for masking the application data and writing the application data at an offset within the memory array register.

18. The computer-readable signal-bearing medium of claim 14 wherein the means in the medium for examining comprises:

instructions for writing the application data in a memory array register to a ldpxxxx.mem file, if a currently accessed pagenumber is different from a last accessed pagenumber;

instructions for reading the application data from the ldpxxxx.mem file into the memory array register, if an element of a page_allocated array corresponding to the currently accessed pagenumber is a first predetermined value;

instructions for initializing the element of the page_allocated array corresponding to the currently accessed pagenumber to the first predetermined value and initializing the memory array register to indicate a known value, if the element of the page_allocated array corresponding to the pagenumber is a second predetermined value;

instructions for setting the last accessed pagenumber to the currently accessed pagenumber; and instructions for masking the application data and writing the application data at an offset within the memory array register.

19. The computer-readable signal-bearing medium of claim 14 wherein the means in the medium for examining comprises:

instructions for reading the application data at an offset within a memory array register, if a currently accessed pagenumber is the same as a last accessed pagenumber.

20. The computer-readable signal-bearing medium of claim 14 wherein the means in the medium for examining comprises:

instructions for writing the application data to a ldpxxxx.mem file, if an element of a page_allocated array corresponding to a currently accessed pagenumber is a first predetermined value and the currently accessed pagenumber is different from a last accessed pagenumber;

instructions for reading the application data in a memarray register to the ldpxxxx.mem file;

instructions for reading an application data word at an offset in the memarray register; and instructions for setting the last accessed pagenumber to the currently accessed pagenumber.

* * * * *